March 3, 1942.   R. ULLMAN   2,275,238
MEASURING AND CONTROL INSTRUMENT
Filed Feb. 19, 1938   5 Sheets—Sheet 1

INVENTOR.
ROY ULLMAN
BY George W. Mauersamp
ATTORNEY

March 3, 1942.  R. ULLMAN  2,275,238

MEASURING AND CONTROL INSTRUMENT

Filed Feb. 19, 1938  5 Sheets-Sheet 2

Inventor:
Roy Ullman,

C.B. Spangenberg
Attorney.

March 3, 1942.   R. ULLMAN   2,275,238

MEASURING AND CONTROL INSTRUMENT

Filed Feb. 19, 1938   5 Sheets-Sheet 3

INVENTOR.
ROY ULLMAN
BY George M. Munchamp
ATTORNEY

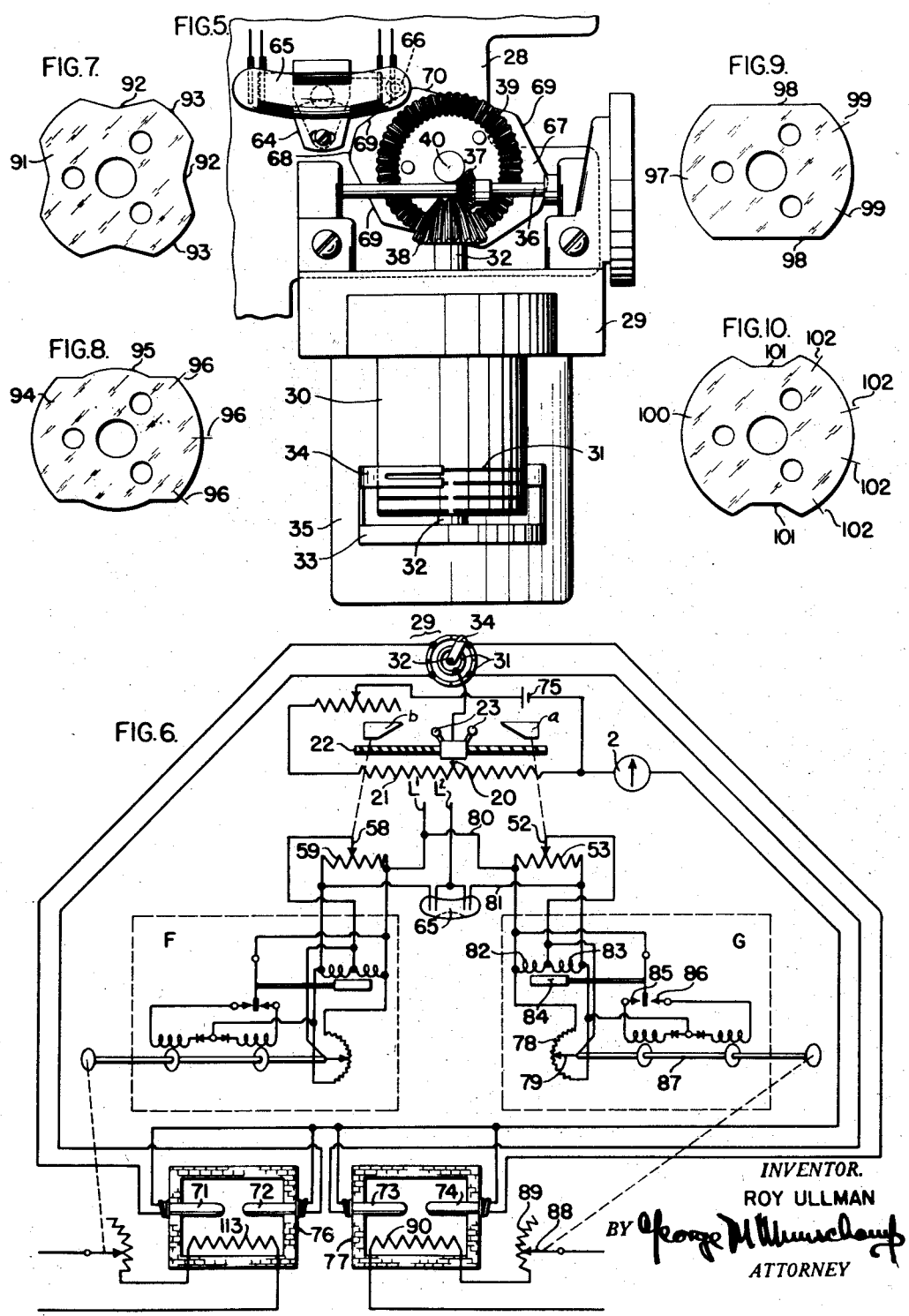

March 3, 1942. R. ULLMAN 2,275,238
MEASURING AND CONTROL INSTRUMENT
Filed Feb. 19, 1938 5 Sheets-Sheet 5
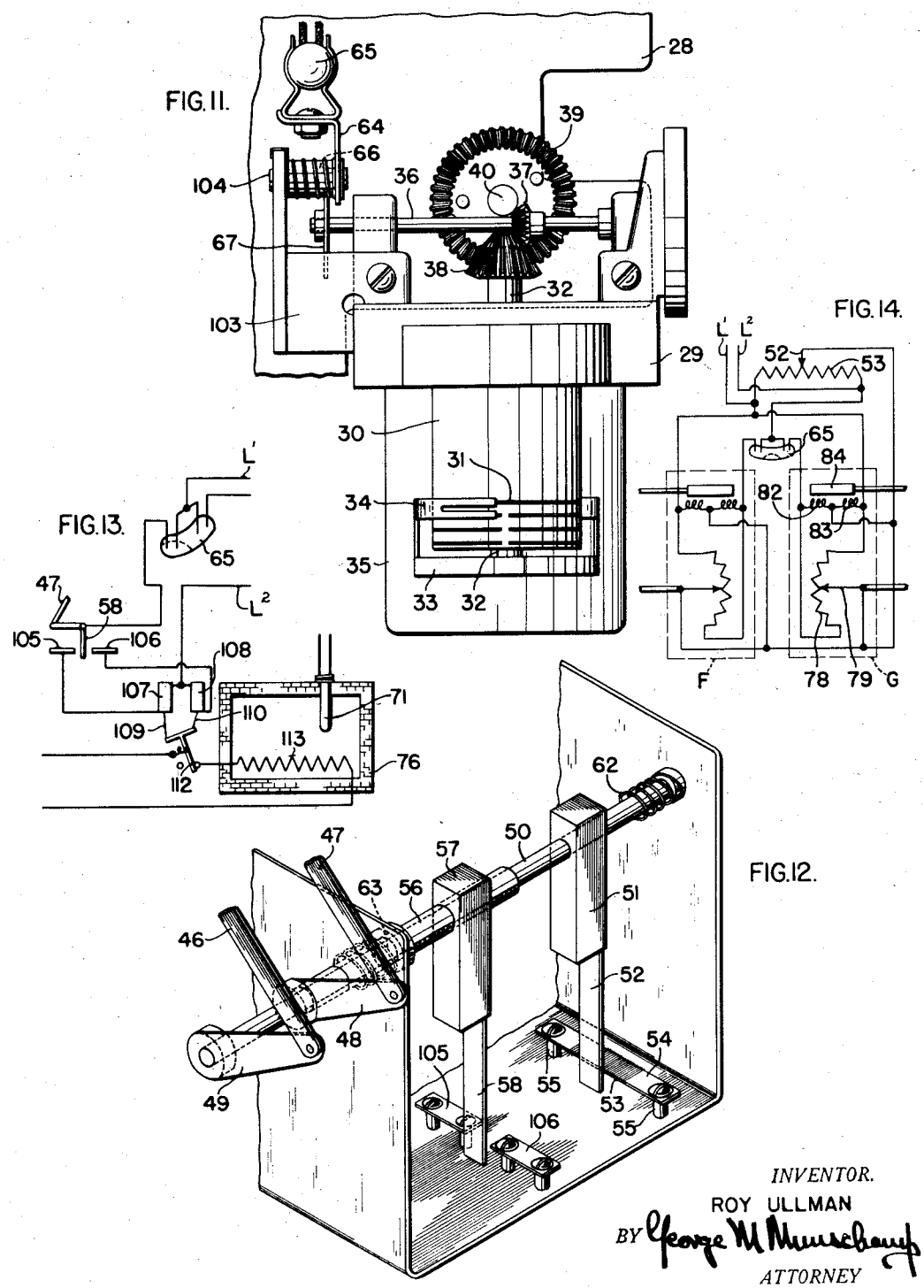
INVENTOR.
ROY ULLMAN
BY George M. Muschamp
ATTORNEY Patented Mar. 3, 1942

2,275,238

UNITED STATES PATENT OFFICE 2,275,238

MEASURING AND CONTROL INSTRUMENT

Roy Ullman, Roslyn, Pa., assignor to The Brown Instrument Company, Philadelphia, Pa., a corporation of Pennsylvania Application February 19, 1938, Serial No. 191,464

17 Claims. (Cl. 236—78)

This invention relates to control apparatus and more particularly to control apparatus for controlling a variable condition, such as pressure, temperature, humidity, flow or the like, to maintain a predetermined value of said condition.

More particularly my invention relates to apparatus designed to effect control actuations in response to deviations of a deflecting meter element from a predetermined position and to set into operation, in response thereto, agencies tending to return said element to said predetermined normal position.

Still more particularly my invention is concerned with control instrumentalities operating in response to changes in a variable condition to control the latter within close limits, which instrumentalities are robust in construction and adaptable to heavy duty service such as is required in industrial plants, such, for example, as in steel mills and the like.

In the Thomas R. Harrison Patent 1,946,280, issued February 6, 1934, control instrumentalities were disclosed whereby control elements such as mercury switches were actuated to effect the desired control action in response to the deviations of a variable condition from normal. I have disclosed herein, however, modifications in and improvements over the disclosures of said patent.

Although adaptable to other uses, my invention is of special utility in connection with potentiometric measuring apparatus comprising a galvanometer deflecting in accordance with potentiometric unbalance resulting from a change in value in a condition measured by said apparatus and automatic potentiometer rebalancing means serving also to adjust an indicator or recorder member.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 5 is a view of the selector switch and the control switch;

Fig. 6 is a wiring diagram showing the control system;

Figs. 7–10 are views of various cams;

Fig. 11 is a view of a modified form of control switch mounting;

Fig. 12 is a perspective view of a modified control arrangement;

Fig. 13 is a wiring diagram of the control arrangement of Fig. 12; and

Fig. 14 is a diagrammatic view of a modified control circuit.

Figure 1:
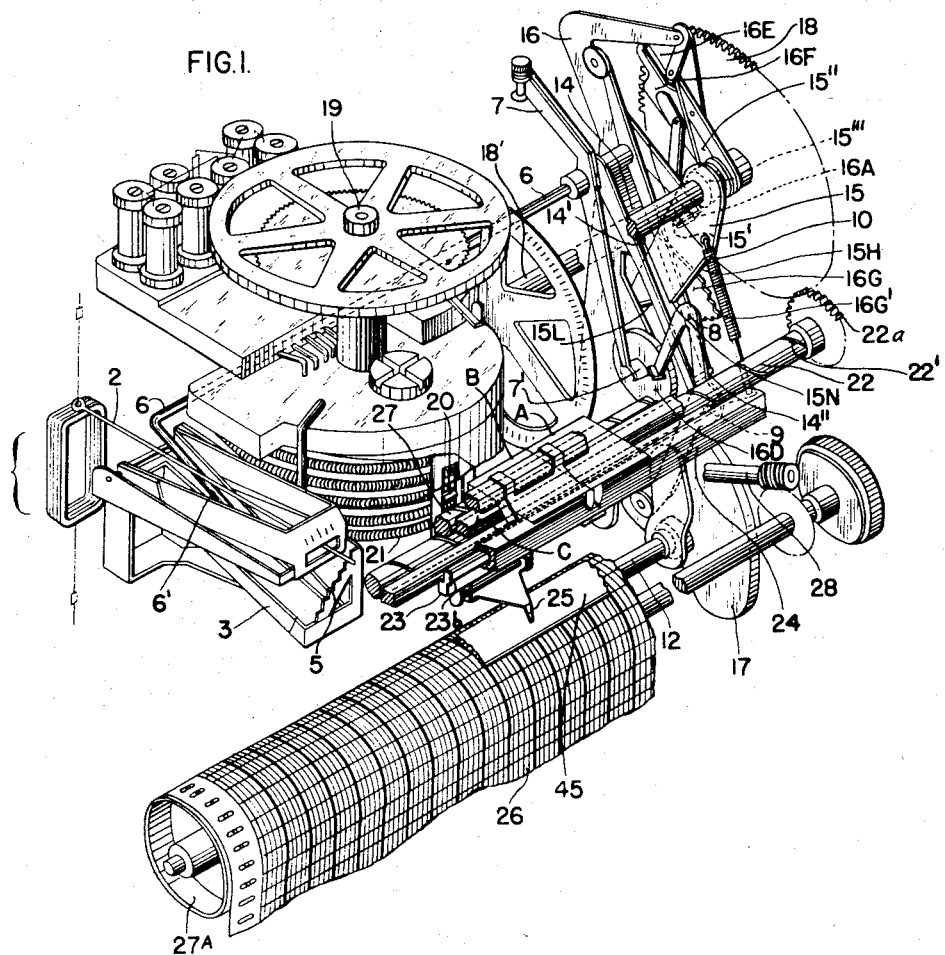
Fig. 1 is a perspective view of a portion of the apparatus.

The recording potentiometer instrument shown in perspective in Fig. 1, and significant operative parts of which are illustrated in Fig. 1, includes a galvanometer, the pointer 2 of which deflects in response to a condition of unbalance in the potentiometer measuring circuit, which may be any well-known form including the resistance 21 which may be adjusted to rebalance the potentiometer. The instrument also comprises mechanical relay provisions operated by a constantly rotating driving motor (not shown) and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, I make use of certain instrumentalities to be later disclosed.

The control provisions which, in their construction and arrangement, and in their combination with the above-mentioned rebalancing and carriage adjusting and control mechanism, constitute the features of the present invention, include two control tables, A and B, which are identical in most respects, and means by which control resistances are actuated by said mechanism when the recorder carriage 23 is displaced in one direction or the other from the respective control tables. The control tables are normally stationary but may be manually adjusted along the path of movement of the carriage 23. The position of the control tables along said path corresponds to, and determines the normal value of the quantities being measured, while the position, at any instant, of the carriage 23 corresponds to, and constitutes a measure of, the current value of said quantities.

The mechanism of the instrument of Fig. 1 through which the deflection of the galvanometer pointer 2 controls the adjustments of the recorder carriage 23 and the rebalancing of the potentiometer circuit on a variation in the quantity or value measured by the galvanometer comprises a pointer engaging and position gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2. The element 3 is engaged by, and turns with the arm 6' of a rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7, thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15 engages the bottom wall of a slot 14' in the member 14, and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring 16C gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15, when in locking engagement with the secondary pointer 14, controls the action of the pawls 16E and 16F by virtue of the fact that a collar or hub portion 15''' of the part 15 carries a spring pawl engaging arm 15''. The movement of the locking part 15 into the position in which its shoulder 15H engages the secondary pointer 14 causes the arm 15'' to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15'' shifts the pawl 16F into operative engagement with the wheel 18, and the latter is then adjusted in the counterclockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14, and thereby arrest the forward movement of the ratchet lever 16. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral position, the portion 14'' engages an upper or lower shoulder 16G² or 16G³ more or less distant from the central shoulder 16G', and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear 22a carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion transverse to and through which the shaft 22 extends, two projections 23b, one at each front corner of said body portion which bear against the inner edge and upper side of the lower flange of a channel bar or rail 24 forming part of the instrument framework, and two projections terminating in rollers 23c which extend in vertical planes transverse to the shaft 22 and rail 24. In addition, the body portion of the carriage frame is provided with a forwardly extending tongue passing beneath the rail 24 and terminating in an uprising pointer or index 23d, adapted to cooperate with a scale 24' fastened to the front face of the rail 24 to indicate the position of the pen carriage and the value of the quantity measured and recorded by the instrument.

The record sheet 26 passes over and is given feeding or advancing movements by a record feed roll 27A. The latter is intermittently rotated by means of a worm and screw connection between the shaft of the roll 27A and a transverse shaft 28. Shaft 28 is intermittently actuated by means of a ratchet and lever device 30 which is engaged and oscillated by the arm 8' of the rocker 8 on each oscillation of the latter.

Figure 2:
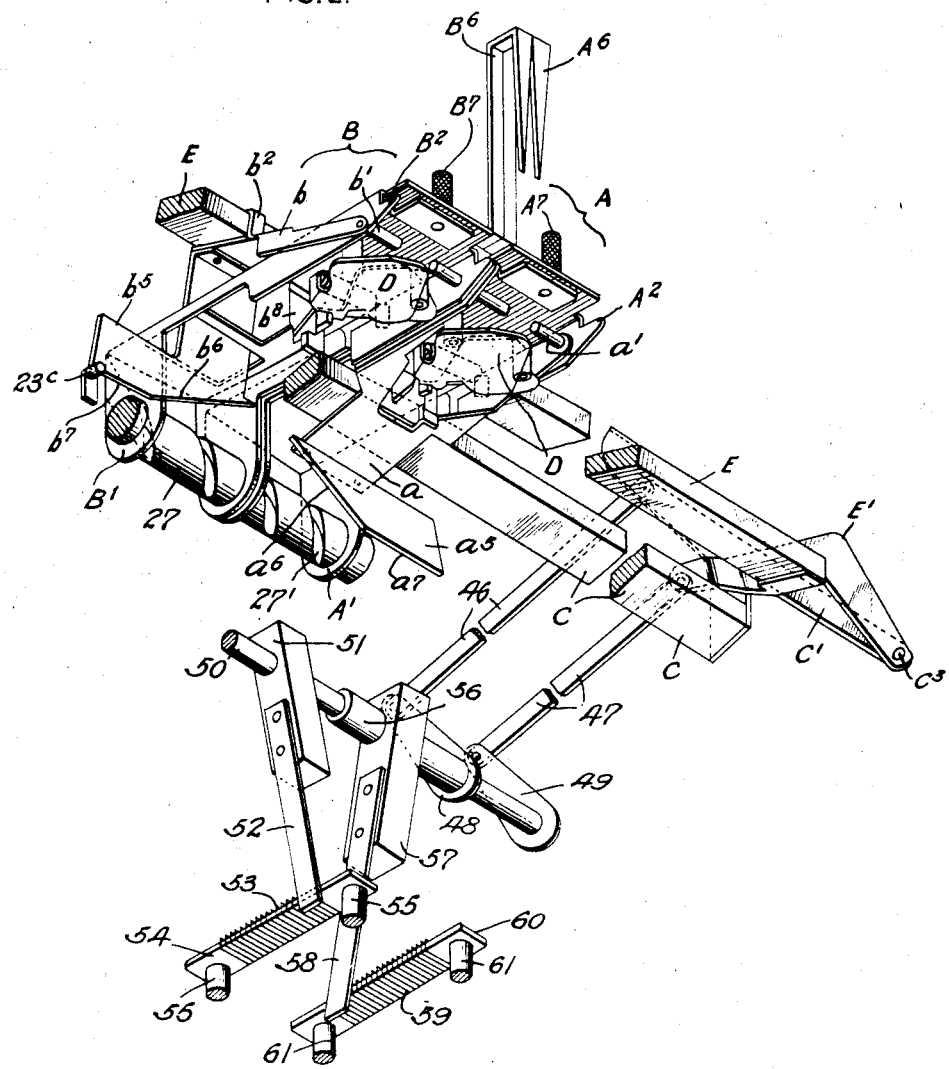
Fig. 2 is a perspective view of the control tables and the control elements with their connecting links.

The control table A of the instrument shown in Figs 1 and 2 comprises a sheet metal frame having ear portions A' apertured for the passage of a shaft 27 mounted in the instrument framework alongside the shaft 22, and having bearing parts $A^2$ which engage and slide along the upper flange of the rail 24. To facilitate the adjustment of the control table A along the path of travel of the pen carriage 23, the shaft 27 is shown as formed with a thread groove 27' which is adapted to receive a cam or mutilated thread rib part that may be secured to the control table frame. The shaft 27 may be rotated to adjust the control table in any suitable manner, as by means of a transverse shaft geared to the shaft 27 and rotated by an operating handle or knob at the front of the instrument. The control table A, however, is, as shown, moved along the shaft 27 by hand independently of shaft 27 and clamped in position by engagement between rail 24 and a screw $A^7$ carried by the table A. An index $A^6$ in conjunction with a scale on the front face of the rail 24 may indicate the adjustment of the table and the corresponding normal value of the quantity measured.

A member a is hinged at one edge to the frame of the control table A by a pivot or pintle shaft a' extending parallel to the shaft 27. The member a is formed with guiding provisions including a part $a^2$ for a bar-like part C which extends parallel to the shaft 27 and is rigidly secured at its ends to arms C' at opposite ends of the instrument which are pivotally connected at $C^3$ to the instrument framework, so that the yoke like structure formed by the bar C and arms C' may turn with respect to the instrument framework about an axis coinciding with that of the hinge connection a', between the table A and part a. The part a and bar C are held by the said guiding provisions against independent turning movements about the axis of their respective pivotal supports. The part a and bar C have a gravital tendency to move from their highest positions, shown in Fig 3, into or toward their lowermost positions, shown in Fig. 2. Their movement downward below their last-mentioned positions is prevented by the engagement of a projection $C^4$ from the arm C' with an adjacent portion of the instrument framework. The extent to which the parts a and C are permitted to swing downwardly from their uppermost positions depends upon the relative positions of the table A and the recorder carriage 23. When the value of the quantity measured is so low that the carriage 23 is entirely at the low side (left-hand side as seen in Fig. 1) of the control table A, the carriage 23 permits movement of the parts a and C to their lowest position. When the current value of the quantity measured is suitably close to the normal value of that quantity, the control table and marker carriage 23 are in such relative positions that downward movement of the hinged part a is prevented or restricted by the engagement of a portion of that part with the marker carriage 23. When an increase in the quantity measured results in a movement of the recorder carriage 23 to the high side of the control table A, that movement causes the part a to be positively secured against down movement from its uppermost position by adjusting a latch member into its latching position. The manner of accomplishing this will now be described.

Figure 4:
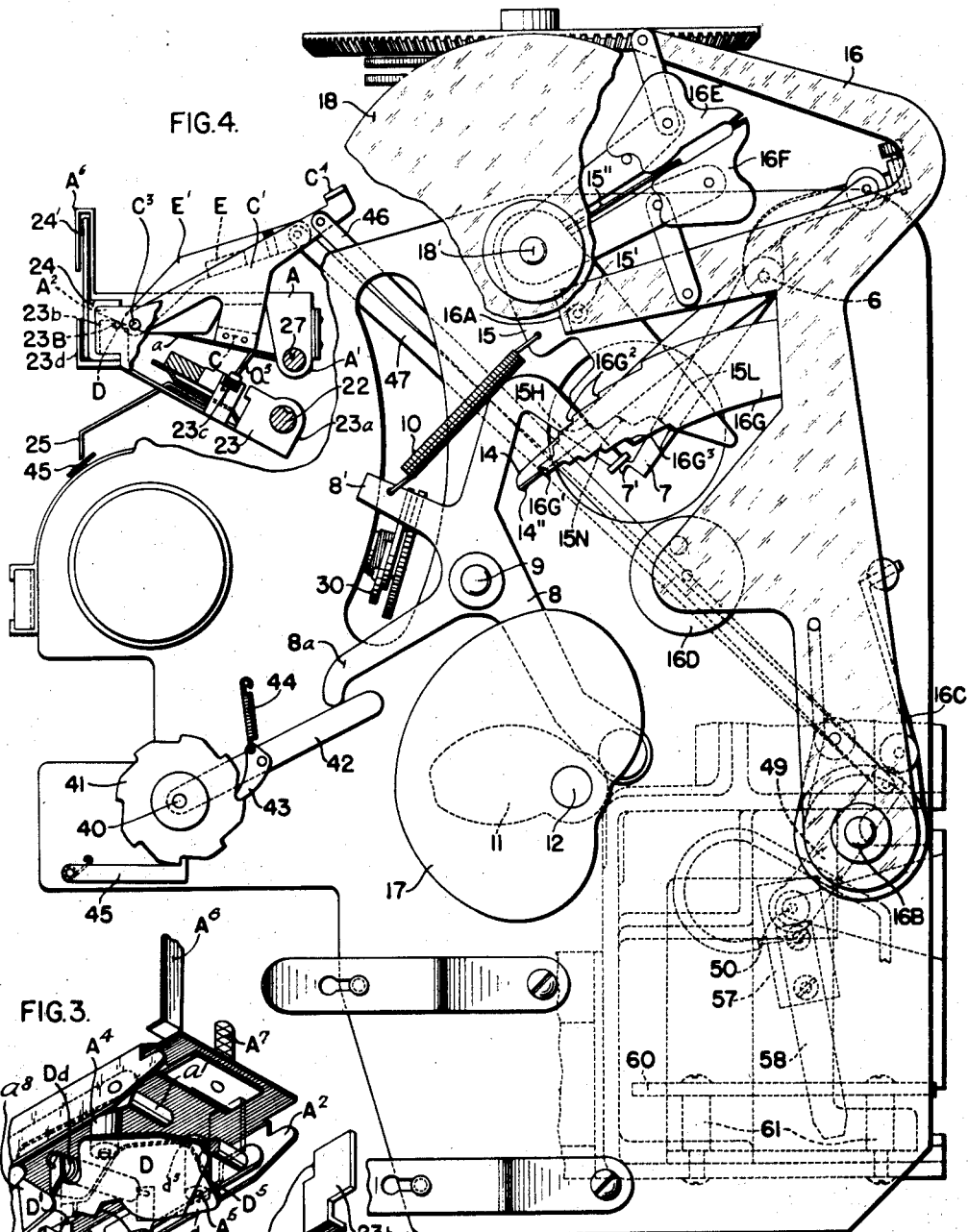
Fig. 4 is a side elevation looking generally from the right of Fig. 1.

The part a has a carriage engaging portion $a^5$ secured to it, as shown in Fig. 2, which is formed with an inclined edge $a^6$ and a horizontal edge $a^7$ that is adapted to be engaged by one of the rollers 23c on carriage 23. For a normal value of the quantity being measured, the roller 23c is positioned approximately half way along the inclined edge $a^6$, and as its value becomes lower, the carriage 23 is moved to the left, thus permitting part a and its attached bar C to be lowered around a' as a center. As the value of the measured quantity increases, the carriage 23 moves to the right, thus raising part a. A latch D on table A secures the part a in its upper position. The latch D (see Fig. 4) is pivotally mounted on a stud $A^4$ depending from the underside of the plate-like body of the table A. In the latching position of the member D, a finger-like portion of the member extends beneath a portion $a^8$ of the part a which is some distance to the rear of the hinge shaft a'.

Figure 3:
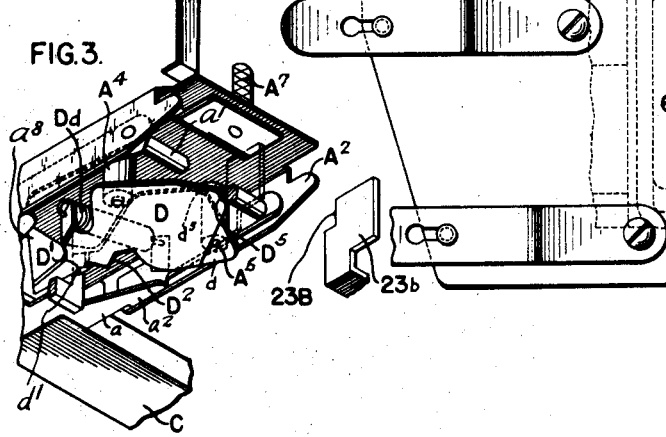
Fig. 3 is an enlarged perspective view of one control table showing the locking mechanism therefor.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member d pivotally mounted on a stud $A^5$ depending from the underside of the control table frame alongside the stud $A^4$, and a spring Dd connecting the members D and d. The spring Dd tends to move the member D in the counter-clockwise direction, as seen in Fig. 3, and to move the member d in the opposite direction about their respective pivotal supports $A^4$ and $A^5$; such turning movements of the members D and d are prevented by the engagement of the finger portion $d'$ of the part $d$ with the shoulder $D'$ of the member $D$, when the latter is in its latching position, as shown in Fig. 3. In the non-latching position of the member $D$, the finger $d'$ engages a shoulder $D^2$ of the part $D$.

The members $D$ and $d$ are moved from the latched position shown in Fig. 3 into the unlatched position of Fig. 2, and back again into the position shown in Fig. 3 by the engagement of the recorder carriage shoulder 23B with the cam shaped front edges $D^5$ and $d^5$ of the members $D$ and $d$, respectively. The edges $D^5$ and $d^5$ are so respectively shaped and disposed that as the carriage moves to the high side of the control table, the shoulder 23B acts on the edge $d^5$ to turn the member $d$ counter-clockwise, as seen in Fig. 3, so that the spring $Dd$ may then move the member $D$ into its latching position in which its shoulders $D'$ engage the finger $d'$. When the carriage 23 subsequently moves back from its high position, the shoulder 23B engages edge $D^5$ of the member $D$ and moves the latter into its non-latching position while permitting the spring $Dd$ to move the member $d$ into the position in which its finger $d'$ engages the shoulder $D^2$ of the member $D$ and holds the latter in its non-latching position.

The second control table B is somewhat similar to control table A, but works in the opposite direction. This control table also comprises a sheet metal frame having ear portions $B'$ apertured to receiver shaft 27 and bearing parts $B^2$ which engage and slide along the flange of the rail 24, and may be held in position by screw $B^7$. An index $B^6$ in conjunction with scale 24' indicates the adjustment of this table and the normal value of a second quantity to be measured, that is different from, and at a lower value than, the quantity whose normal value is represented by the position of table A. A member $b$ is hinged at one end on pintle shaft $b'$ and extends above the table B where it is formed with guiding provisions including part $b^2$ for bar-like part E which extends parallel to bar C. The part E is rigidly secured at its opposite ends to arms $E'$ that are also pivoted at $C^3$ to the instrument framework. The part $b$ and bar E have a gravitational tendency to move counter-clockwise in Fig. 2 from their highest position. Their movements downward are limited by contact between part $b$ and the top of the control table B. The limit of their upward movement is determined by engagement between one of the rollers $22c$ and horizontal edge $b^7$ of carriage engaging portion $b^5$ that is attached to part $b$ at its rearward end. This carriage engaging portion $b^5$ has an inclined edge $b^6$ that corresponds to edge $a^6$ but is inclined in the opposite direction. Because of this inclination, as carriage 23 moves up scale (right in Fig. 1), part $b$ and its associated bar E will be lowered, and upon down-scale movement of carriage 23, part $b$ and bar E will be raised around $b'$ as a pivot. The table B has a latch mechanism D on it that is identical to the one that has already been described in connection with table A, and as the carriage 23 continues to move down scale, shoulder 23B will engage cam edge $D^5$ of the latch of this table to move the finger-like portion of member D under a portion $b^8$ of part $b$ to keep this part in its raised position.

The above-described cooperation of the control tables A and B with the pen carriage 23 is used to effect control of various conditions to which the galvanometer may be successively subjected. To this end of making the galvanometer successively responsive to a plurality of conditions, there is provided on one side plate of the instrument, preferably the plate at the left end, which is not shown in Fig. 1, but which is shown at 28 in Fig. 5, a switch of the type disclosed in Harrison Patent 1,770,918 for successively connecting a plurality of thermocouples in circuit with the galvanometer. The switch 29 consists of an insulating body 30 upon which are disposed contacts 31 that are in circuit with a plurality of thermocouples which measure the various conditions to be controlled. Extending through the body 30 is a shaft 32 which has attached to its lower end a disc 33 upon which are mounted contacts 34. The assembly just described is covered by a glass case 35 which may, if desired, be filled with oil to prevent the contacts from becoming corroded and dirty. Mounted in the support for the switch is a cross-shaft 36 upon whose front end is mounted an indicating arm that is adapted to cooperate with a suitable dial to show which thermocouple is in circuit with the galvanometer. The shaft 36 and shaft 32 are caused to turn together by bevel gears 37 on shaft 36, and 38 on shaft 32. The gear 38 is also in mesh with a third gear 39 attached to shaft 40, which extends through the instrument and has mounted upon its other end (Fig. 4) a ratchet 41.

This ratchet is rotated by some suitable means to periodically turn the shaft 40 to rotate contacts 34, and to place the various thermocouples successively in circuit with the galvanometer. Such a rotating means may very well be of the type shown in Harrison Patent 1,946,280, but for purposes of simplicity and clearness is shown as an arm 42 mounted to rotate on shaft 40, upon which is pivoted a pawl 43. The arm and pawl are biased in a counter-clockwise direction by spring 44 into engagement with the end of arm $8a$ on lever 8. Upon each rotation of the shaft 12, lever 8 is rocked counter-clockwise by cam 11, and arm $8a$ moves arm 42 clockwise so that pawl 43 moves the ratchet 41 clockwise for a distance of one tooth. Holding pawl 45 serves to prevent retrograde movement of the ratchet 41 and shaft 40 and tends to lock them in position.

After each rebalancing operation, as above described, and before the arm 42 is actuated to rotate shaft 32 and connect another thermocouple in circuit therewith, the marker 25 is caused to move downwardly into engagement with an inked ribbon 45 to cause the ribbon to make a record mark on chart 26. The mechanism for performing this operation is not shown since it forms no part of the present invention, but may be of the type shown in Harrison Patent 1,946,280, or some mechanism similar thereto.

The movement of control tables, parts $a$ and $b$, and their respective bars C and E perform their control functions each by moving a contact along the length of a resistance of a proportioning system, to be later described. To this end the arm $C'$, which is fastened to bar C, has pivoted at its outer end a link 46 extending downwardly and rearwardly of the instrument. The lower end of this link is attached to an arm 49 which is fastened to a shaft 50 journalled in the framework of the instrument. Also attached to the shaft 50, at a point removed from arm 49, is an insulating block 51 which has a contact member 52 on its lower end. The contact member is adapted to move across the edge of the proportioning resistance 53 wound on an insulating block 54 that is supported on pins 55. In a like manner, the arm E' has pivoted to its outer end a link 47, whose lower end is pivoted to arm 48. The inner end of arm 48 is fastened to one end of a tubular shaft 56 that surrounds and is journalled on shaft 50, and has attached to its other end an insulating block 57. Fastened to block 57 is a contact arm 58 that is adapted to move across the edge of the proportioning resistor 59 mounted on an insulating block 60 that is in turn supported in the instrument framework by pins 61.

In order to exert a slight force on parts a and b of the control tables so that they will always be urged toward their lowest position, a pair of springs (see Fig. 12) 62 and 63 are each fastened at one end to the frame of the instrument and have their ends respectively attached to shafts 50 and 56. The weight of the various parts could be used alone if desired, to tend to keep parts a and b in their lowest positions, but the use of the springs makes the action more positive.

As the carriage 23 is made successively responsive to the individual thermocouples through switch 29 and in turn adjusts a plurality of control means, such as resistors 53 and 59, the effective one of said resistors is determined by selecting means hereinafter described and acting synchronously with switch 29. Furthermore, in some cases, it may be desirable to record the values of more conditions than are to be controlled. For example, it may be desirable to both record and control the value of the temperature in a certain part of one furnace, but to only record the temperature of another part of the same furnace. Such an arrangement is contemplated herein for a plurality of furnaces in the same instrument. In such a case, the control apparatus individual to the furnace, the control thermocouple of which is in circuit, should be rendered effective and all other control apparatus rendered ineffective, and all the control apparatus should be disconnected while a record is being made of the value of the non-controlling thermocouple. In order to selectively control the connection of the control apparatus, there is pivotally mounted on the left-hand end plate 28 of the instrument a rockable support 64 for supporting a double throw mercury switch 65. The support 64 is normally biased by either spring or gravity, or both, in a clockwise direction in Fig. 5, so that a roller 66 on one end thereof will be held in contact with cam 67 that is attached in any suitable manner to gear 39. The cam 67 is designed as suitable for a four record, two point control pyrometer, but other cams of suitable contour, such as are shown in Figs. 7–10, may be substituted therefor if desired.

By a four record, two point control pyrometer, I mean one in which a record is made of the temperature values of each of four thermocouples and the heating media to which two of the thermocouples are responsive may be separately controlled. The control selection in such an instrument is accomplished by the cam 67 which has two high portions 68, four intermediate portions 69, and two low portions 70, an intermediate portion being in between each high and low portion. As shaft 40 is rotated to successively connect the thermocouples with the measuring instrument, the cam 67 will be rotated to rock the support 64 and switch 65. In this manner, the contacts at first one end, under the action of cam portions 68, and then the other, under the action of cam portions 70, will be closed to alternately connect the proper control means with the instrument. When the roller 66 is on an intermediate portion 69 of the cam, both sets of switch contacts will be open so a record is made with no corresponding control action. The shaft 32 makes two revolutions to each revolution of shaft 40 which makes necessary the double cycle of selector switch operation in each revolution of cam 67.

The wiring diagram of Fig. 6, representing a four record, two point control system, includes an ordinary potentiometric measuring circuit responsive successively to four thermocouples, and two control circuits individual to two of said thermocouples. It is sufficient for the present purposes to note that the potentiometer circuit includes a circuit branch that may be connected by the switch 29 with any one of thermocouples 71, 72, 73, or 74, in series with a galvanometer 2. An opposing branch includes a battery 75 and the resistor 21, a variable portion of which may be connected into the opposed branches by means of sliding contact 20, whereby the respective effects of the variable and known sources are made equal and opposite and the moving coil of the galvanometer is brought to a neutral position for a given value of E. M. F. of the thermocouple then in the circuit. As has been above explained, the pen carriage 23 is moved in synchronism with the contact 20 so that its position is an indication of the thermocouple temperature. As the contact 34 is rotated, the various thermocouples are brought into circuit so that a record is made of their temperatures. As the controlling thermocouple is brought into circuit, either the high portion 68, or the low portion 70, of cam 67 comes under roller 66 to close one pair of contacts in switch 65. If, for example, it is desired to control the temperature of furnaces 76 and 77 in accordance with the temperatures of thermocouples 71 and 73 respectively, at the time thermocouple 71 is in circuit, the left contacts of switch 65 are closed, and at the time thermocouple 73 is in circuit, the right contacts are closed. These contacts are included in a control circuit respectively to two proportioning control systems G and F now to be described.

The control devices F and G are identical so that a description of one will suffice. The control device G consists of a balanced Wheatstone bridge circuit, two balance arms of which are formed by resistance 53. The division between the arms is the point of contact of contact arm 52 therewith. The other two balance arms of the bridge circuit comprise resistance 78 that is divided by movable contact arm 79, and the bridge is energized by conductors 80 and 81 from the line L' and L² by way of the right-hand contacts of switch 65. A device consisting of connected induction coils 82 and 83, also energized from line L', L², and connected across the energizing terminals of the bridge, is responsive to unbalance in the bridge circuit caused by movement of arm 52 along resistance 53 in a manner above described. As the current flowing through coils 82 and 83 is varied, an armature 84 is moved axially to energize, through either contact 85 or 86, one field of reversible motor 87. Rotation of the motor 87 in the proper direction moves contact arm 79 along resistance 78 to rebalance the bridge. This in turn equalizes the current in coils 82 and 83 so that armature 84 moves to open contact 85 or 86 to stop motor 87. It is noted that limit switches are provided in the circuit of motor 87 to prevent over-travel of the motor.

Rotation of motor 87 to rebalance the bridge circuit also moves contact arm 88 along resistance 89 to vary the current supply to heater 90 in furnace 77. In this manner, the temperature of the furnace 77 is controlled. Since the movement of arm 88 is proportional to that of arm 79, a graded control of the furnace temperature is attained in accordance with movement of part a, motor 87.

From the above description, it will be apparent that if, when thermocouple 73 is in circuit and the right-hand contacts of switch 65 are closed, pen carriage 23 moves up-scale, or to the right in Figs. 1 and 6, due to a rise in the temperature to which thermocouple 73 is subjected, one of the rollers 23a will engage cam edge $a^6$ and raise part a. This will, through its connecting links, move contact arm 52 along resistance 53 to unbalance the bridge circuit of control device G. The armature 84 will be shifted in accordance with the unbalance to energize motor 87 in such a direction that contact arm 88 will be moved to lower the current supply to heater 90 and thereby lower the temperature of the furnace. In an opposite manner, movement of pen carriage down-scale will cause the temperature of the furnace 77 to be raised.

Continued rotation of shafts 32 and 40 will bring switch 65 into the position of Fig. 5 in which both control circuits F and G are rendered inoperative, and a record is made at this time of the temperature to which thermocouple 74 is subjected. On the next movement of shafts 32 and 40, thermocouple 71 is connected in circuit, and the left contacts of switch 65 will be closed, energizing control device F, control device G remaining deenergized. Thereafter, the position of pen carriage 23 relative to part b of control table B will cause contact 58 to be moved to some corresponding position along resistance 59. In a manner above-described, in connection with control device G, the bridge circuit in control device F will be rebalanced, and the current supply to heater 113 will be maintained proportional to the position of carriage 23.

The application of this device is not limited to any specific number of records or controls such as has been described above. For example, if it was desired to control on only one record, one of the control devices F or G with its corresponding control table could be omitted. There are shown in Figs. 7 to 10 cams of various shapes that can be substituted for cam 67 to adapt the controller to a different number of records and/or controls.

In Fig. 7, there is shown a cam 91 that is designed to be used on an instrument that will record two temperatures and control one. In Fig. 6, for example, such an instrument might be used to control one furnace such as 77, the control table B, resistor 59 and associated parts being omitted and thermocouples 73 and 74 being connected to alternate segments of switch 29. Cam 91 has four low faces 92 and four intermediate faces 93 alternately formed about its periphery. Since there are no high faces, or faces that have a radial distance equal to that of face 68 on cam 67, the left-hand contacts of switch 65 will never be closed. When face 92 is under roller 66, control device G will be energized with control thermocouple 73 in circuit, and deviation from the normal value of the temperature being controlled will cause a corrective change of contact 88 along rheostat 89. When face 93 is under roller 66, the contacts of switch 65 will be opened and the temperature of the other thermocouple 74 will be recorded.

In Fig. 8, there is shown a cam 94 that is used in an instrument that records four temperatures and controls one. This cam 94 is so shaped that it has one low position 95 in which the control apparatus is energized and three intermediate positions 96 as is shown in the figure in which a record only is made. In an instrument using a cam of this sort, all four thermocouples may be in one furnace, such as furnace 77, and the heater 90 thereof may be controlled from the temperature of one of them.

In Fig. 9, there is shown a cam 97 that is used in an instrument for recording three temperatures and controlling one of them. This cam is so shaped that it has one low face 98 to two intermediate faces 99. The use of a cam such as this necessitates a ratchet 41 that has six teeth instead of eight, since one-sixth of a rotation of the cam is needed to bring each of the actuating portions of the cam 97 under roller 66. This type of cam also necessitates the use of a selector switch 29 that has three contacts 31 instead of four as is shown in Fig. 6.

In Fig. 10, there is shown a cam 100 that is to be used in an instrument which records five temperatures and controls from one of them. This cam is so shaped that it has one low face 101 to four intermediate faces 102. The use of a cam of this type necessitates a ratchet 41 with ten teeth and a selector switch 29 with five contacts 31.

The cams shown in Figs. 7–10 are so desiged that only one control device such as G is used. Since this is the case, it may be desirable to use a mercury switch of the ordinary tilting type with contacts in only one end instead of the type shown at 65 in Fig. 5. It should also be remembered that the above-described cams are only typical of various other shapes that may be designed for other groupings and combinations in a potentiometric instrument. It is further pointed out that two or more controls could be actuated from each contact arm 52 and 58 if so desired, in which case, each furnace that is controlled by each contact arm would be kept at the same temperature. This could be accomplished by allowing each of the contact arms 52 and 58 move across two or more resistances 53 or 59.

An alternative method of mounting the cam 69, bracket 64 and switch 65 is shown in Fig. 11. In this modification, the shaft 36 is extended rearwardly, and the cam 67 is mounted upon the end thereof. A bracket 103 is attached to the rear of the casing of switch 29, and a stud shaft 104 projects forwardly therefrom. Rotatably mounted on shaft 104 is the bracket 64 that supports switch 65. In this view, a spring 105 is shown to bias the bracket in such a direction that roller 66 is resiliently forced against the cam 67.

At times, it may be preferable to operate a simple on-off control instead of a proportional control to regulate a furnace. In such a case, as the pen carriage moves up-scale to indicate an increase in temperature of the device being controlled, movement of part a or b, as the case may may be, by roller 23c, is used to open the supply circuit to the heater in question, whereas movement of the pen carriage 23 downscale will, through the resultant movement of part a or b, cause the heater circuit to be closed. Such an arrangement is shown in Figs. 12 and 13 in which the control table A is used to operate a proportioning type of control such as has been described above, and control table B is used to control an off-on type of heater.

Referring to Fig. 12, it will be seen that contact 58, which is moved as the part b of control table B moves, is adapted to engage either contact 105 or 106. When, in the operation of the instrument, the selector switch 29 is in such a position that the thermocouple 71 is in circuit, the contacts of switch 65 that are in circuit with arm 58 will also be closed as shown in Fig. 13. If the temperature to which thermocouple 71 is subjected is at the desired value, the pen carriage 23 will be moved to a position along shaft 22 where one of the rollers 23c will engage edge b⁶ and hold the part b at such a height that contact 58 will not engage either of contacts 105 or 106. If, however, the temperature is too low, carriage 23 will move down-scale, or in such a direction that part b is turned clockwise in Fig. 2 to turn contact 58 clockwise in Fig. 2 or counter-clockwise in Fig. 12 to engage contact 106. Upon such engagement, current flows from L', through switch 65, contacts 58 and 106 to the solenoid 108 and back to L₂. The energization of solenoid 108 through link 110 tilts switch 112 to closed position, thus closing the circuit to heater 113 in furnace 76. In a like manner, if the temperature in the furnace is too great, the pen carriage 23 will move up-scale to lower member b. This in turn moves contact 58 to engage contact 105 and energizes solenoid 107 to move link 109 and open switch 112. This permits heater 113 to cool down.

As will be apparent to those skilled in the art, the control apparatus shown is characterized by the relative simplicity and effectiveness of obtaining a positive control of two different conditions by a single instrument. By the use of different cams, as has been pointed out above, in connection with the control tables the instrument is made as versatile as it is simple. Merely changing the positions of the control tables permits the instrument to control the furnaces at any desired temperature within its range.

If it is desired to control the temperature of more than one furnace at the same point, it may be preferred to use only one of the control tables A or B and a corresponding single contact and resistance 52 and 53, or 58 and 59. The apparatus of my invention may be used in this manner, if desired, by connecting the various control devices to the single contact and resistance as shown in Fig. 14, in which figure only that part of each control device necessary to illustrate the connections is shown. The operation is accomplished by merely connecting contact 52, for example, directly with the movable contacts 79 of the control devices F and G, connecting one end of the resistance 53 with one end of the resistances 79 in the control devices and connecting the other end of resistance 53 with the other ends of resistances 79 through the selector switch 65. It will be clear from the drawings, that by tilting switch 65, in a manner above described, one or the other of the control devices will be energized and placed in a bridge circuit with resistance 53. Thus, a movement of contact 52 along resistance 53 will unbalance the control device then in circuit to unbalance that network and energize its motor 87 in a direction to balance the network and adjust its corresponding furnace rheostat.

An alternative method of controlling two furnaces at the same temperature would be to have both of the contacts 52 and 58 connected to move with the cam a of control table A, for example. In such a case, the switching arrangement of Fig. 6 would be used in exactly the form that it is there shown.

If it is desired, instead of connecting the switch 65 as shown so that the motor 87 is deenergized along with the bridge systems, the connection may be made so that the switch is directly in the common line from the motor fields. The result in each case will be the same since the circuit to the motors 87 is broken by switch 65 when the control device is not being used.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control instrument, a member longitudinally movable in accordance with variations in measurable conditions, a pair of longitudinally adjustable devices in the path of travel of said member, each device having a separately movable cam part, elements on said member adapted to individually move said cam parts as said member moves, means to move said member longitudinally in a given direction for a given variation in said conditions with sufficient force to directly move said cam parts whereby said elements will move said cam parts as they pass said devices, said cam parts and said elements being so relatively shaped that the cam parts will be moved in opposite directions by movement of said member in one direction, and means operated by movement of said cam parts to correct the variations in said conditions.

2. In a measuring and control instrument, means to sequentially measure the value of a plurality of variable conditions, a member moved in accordance with the values of said conditions, parts adjustable along the path of travel of said member to positions representing the normal values of said conditions and adapted to be moved by said member, control means for some of said conditions adapted to be actuated by movements of said parts by said member, said control means each comprising apparatus in a normally stable condition, means to move said parts, by movement of said member relative to the part representing the normal value of the condition being controlled, to unbalance the apparatus, and means to simultaneously rebalance said apparatus and effect an adjustment of said condition towards normal.

3. In a measuring control instrument, means to sequentially measure the value of a plurality of variable conditions, a member movable in accordance with the values of said conditions, parts adjustably positioned along the path of travel of said member, the position of each of said parts representing the normal value of a condition, an element on said member to move said parts as it passes them, control means for a condition actuated by movement of each part as said member is moved past it, said control means each comprising apparatus in a normally stable condition, means to move said parts, by movement of said member relative to said part representing the normal value of the condition being controlled, to unbalance the apparatus, and means to simultaneously rebalance said apparatus and effect an adjustment of said condition towards normal.

4. Measuring and control apparatus comprising measuring means adapted to measure in sequence a plurality of variable conditions, individual control means each adapted to control one of said variable conditions, a member movable along a path in accordance with the individual values of said conditions, a pair of separately mounted devices in the path of travel of said member, a part on each device adapted to be proportionately moved by said member in its travel, and means connecting each said part with one of said control means to thereby adjust said control means in accordance with movement of said part.

5. Measuring and control apparatus comprising measuring means, mechanism connected to said measuring means whereby said measuring means can measure the value of a plurality of different conditions, a control device for controlling one of said conditions, said control device comprising a balanced electrical bridge, means actuated by said measuring means to energize said electrical bridge at the time the condition to be controlled is being measured, and means to unbalance said bridge in accordance with the deviation of the value of said condition from a desired value thereof.

6. Measuring and control apparatus comprising measuring means, mechanism connecting said measuring means sequentially to a plurality of devices producing measurable effects, said devices being subjected to variable conditions of different values, means for controlling the conditions to which a plurality of said devices are subjected, said last-named means consisting of balanced electrical bridge circuits adapted to be unbalanced by variations in said measurable effects, and means for effecting control actions by said control means only when the device responsive to the condition to be controlled is connected to said measuring means.

7. Measuring and control apparatus comprising measuring means, mechanism for connecting said measuring means sequentially to a plurality of devices for producing measurable effects, an off-on control means adapted to control a condition to which one of said devices is subjected, a second and graded control means adapted to control a condition to which another of said devices is subjected, a member on said measuring means adapted to be moved along a path in accordance with the individual effects produced by said devices, a part movable to actuate each control device, said parts being positioned in the path of and moved by said member and means to energize each said control means at the time the effect of its corresponding device is being measured.

8. In combination, a potentiometer, a pair of pivoted members mounted thereon, a control table adjustably mounted along each member, a control cam on each table movable with a member, said cams having opposite incilinations, a pen carriage on said potentiometer, means to move said carriage past said tables to positions corresponding to values of a plurality of conditions, individual means on said carriage to separately move each of said cams and their members as it travels past them, and control means adapted to be actuated by movement of said members.

9. In measuring and control instrument comprising measuring means adapted to measure in sequence a plurality of measurable conditions, a member, means to move said member through a path in accordance with the value of each of said conditions, a plurality of devices in the path of movement of said member, each said device including a cam adapted to be moved by said member, a plurality of resistances, a contact movable over each resistance, means connecting each cam with a contact whereby movement of the cams move the contacts a proportional amount and means for effecting a control of the condition being measured by movement of the contact along its resistance.

10. In a measuring instrument, a member movable along a path in response to variations in a condition, a pair of devices adapted to be individually positioned at various points along the path of movement of said member, each said device having a movable part extending downwardly therefrom into the path of movement of said member, an inclined edge on each part adapted to be contacted by said member, the inclination of the edges being opposite, whereby as said member moves in one direction, one part will be raised, and as it moves in the opposite direction, the other part will be raised and means to move said member along its path into engagement with said parts to move the latter.

11. In a measuring and control instrument comprising measuring means adapted to measure in sequence a plurality of variable conditions, means to control one or more of said conditions, said control means comprising a resistance, a contact adapted to move thereover, a link and lever arrangement connected to move said contact, a rockable cam attached to the other end of said link and lever arrangement, the whole being biased in one direction, a member on said measuring means movable in accordance with the value of the condition being measured, means to move said member and an element on said member to engage and move said cam during its movement.

12. In a measuring and control instrument, the combination with a plurality of devices individually responsive to variable conditions, control apparatus adapted to individually control some of said conditions, a separate control device for each said control apparatus, a measuring means adapted to measure said conditions and actuate all of said control devices continuously in accordance with the values thereof, and means to selectively connect said responsive devices to said measuring means and synchronously render operative the control apparatus for the condition being measured for operation by its respective said control device.

13. In a measuring and control instrument adapted to respond to a plurality of conditions, some of which are to be controlled, a separate device individually responsive to each of said conditions, means successively connected to each of said devices and deflectable in accordance with the value of the condition being measured, apparatus to individually control a plurality of said conditions including a plurality of normally de-energized electrical networks that are normally balanced when energized, means responsive to deflections of said first-named means away from a predetermined position to unbalance said networks, a first selector means to sequentially connect said first devices and said means, and second selector means adapted to simultaneously energize a corresponding one of said networks for operation by said responsive means under the control of the device then connected to the responsive means.

14. In a measuring and control instrument, means to measure a plurality of variable conditions, mechanism connecting said measuring means sequentially to a plurality of devices for producing measurable effects in accordance with variations in said conditions from a normal value, means to control the conditions to which a plurality of said devices are subjected, said last-named means comprising for each condition to be controlled, apparatus in a normally stable condition, means to render the apparatus of the conditions not being controlled inoperative, a part, means to move said part in accordance with said effects to unbalance the stability of said apparatus an amount dependent upon the variation of said effects, and means actuated by said unbalance to return said apparatus to a stable condition and to adjust the condition toward normal.

15. In a measuring and control instrument adapted to respond to a plurality of conditions, some of which are to be controlled, a separate device individually responsive to each condition, a measuring means to measure the response of each device, a member moved by said measuring means to a position depending upon the value of said conditions, control means for some of said conditions, means to continuously actuate said control means in accordance with the movement of said member, a first selector means adapted to sequentially connect said devices to said measuring means, a second interchangeable selector means adapted to connect various of said control means to be operated by said member, and means to synchronize the operation of said two selector means.

16. In a measuring and control instrument, a member mounted for movement along a path in response to variations in the value of a condition, a guide spaced parallel to the path of said member, a plurality of devices each indicating the value at which a condition is to be maintained on said guide, means to adjust said devices along said guide to various positions, a part pivoted to each device and extending into the path of movement of said member to be moved thereby independently of said device as said member passes said part, a plurality of rods parallel to said guide and mounted for pivotal movement on an axis aligned with the pivots of said parts, means connecting each bar for movement with one of said parts, and control means actuated by movement of said bars.

17. In a control instrument, control means adapted to control a plurality of different variable conditions, said control means including a part adapted to be moved in one direction to make a control adjustment to vary the value of one of the conditions in one direction, a separately actuated part adapted to be moved in the opposite direction to vary the value of another of the conditions in the same direction as the first condition was varied, separate means responsive to the value of said conditions, a member, means to move said member sequentially in accordance with said responsive means, and means to individually move said parts by said member.

ROY ULLMAN.